US010453604B2

(12) United States Patent
Koo

(10) Patent No.: US 10,453,604 B2
(45) Date of Patent: Oct. 22, 2019

(54) CURRENT TRANSFORMER DEVICE

(71) Applicant: Tera Energy System Solution Co. Ltd, Hwaseong-si (KR)

(72) Inventor: Ja-Il Koo, Bellevue, WA (US)

(73) Assignee: FerrarisPower Co., Ltd, Gyeonggi-do (KR)

( * ) Notice: Subject to any disclaimer, the term of this patent is extended or adjusted under 35 U.S.C. 154(b) by 28 days.

(21) Appl. No.: 15/304,373

(22) PCT Filed: Apr. 2, 2015

(86) PCT No.: PCT/KR2015/003279
§ 371 (c)(1),
(2) Date: Dec. 22, 2016

(87) PCT Pub. No.: WO2015/160120
PCT Pub. Date: Oct. 22, 2015

(65) Prior Publication Data

US 2017/0169944 A1 Jun. 15, 2017

(30) Foreign Application Priority Data

Apr. 15, 2014 (KR) ........................ 10-2014-0044862

(51) Int. Cl.
*B23P 19/00* (2006.01)
*H01F 41/02* (2006.01)
(Continued)

(52) U.S. Cl.
CPC ........... *H01F 41/0206* (2013.01); *H01F 3/02* (2013.01); *H01F 41/024* (2013.01); *H01F 41/06* (2013.01); *Y10T 29/5317* (2015.01)

(58) Field of Classification Search
CPC ......... H01F 17/04; H01F 38/28; C22C 45/00; Y10T 29/49073; Y10T 29/49075;
(Continued)

(56) References Cited

U.S. PATENT DOCUMENTS 6,005,468 A * 12/1999 Shirahata .............. H01F 27/306 336/210
2004/0085173 A1 5/2004 Decristofara
2005/0258705 A1 11/2005 Berwald

FOREIGN PATENT DOCUMENTS

EP 1385179 A1 1/2004
JP 5428603 B2 9/1980
(Continued)

OTHER PUBLICATIONS

International Search Report for PCT/KR2015/003279 dated May 13, 2015 (3 pages).
(Continued)

*Primary Examiner* — Thiem D Phan
(74) *Attorney, Agent, or Firm* — Nixon Peabody LLP

(57) ABSTRACT

A method for manufacturing a separable electromagnetic inductive apparatus is provided. The method for manufacturing a separable electromagnetic inductive apparatus comprises a winding step for winding a steel plate composed of a rolled amorphous magnetic alloy to a circular shape to form a magnetic core; a heat treating and an impregnating step for heat treating and impregnating the wound magnetic core without adding cobalt; a cutting step for cutting the heat treated and impregnated magnetic core to an orthogonal direction to the wound direction of the magnetic core; and a polishing step for polishing the cut surface having a three-dimensional plane of the cut surface of the magnetic core evenly arranged in a fixed state.

5 Claims, 5 Drawing Sheets

(51) Int. Cl.
*H01F 41/06* (2016.01)
*H01F 3/02* (2006.01)

(58) Field of Classification Search
CPC ........... Y10T 29/4902; Y10T 29/49078; Y10T 29/5317; Y10T 29/49071
USPC ....... 29/738, 602.1, 606, 607, 609, 729, 757
See application file for complete search history.

(56) References Cited

FOREIGN PATENT DOCUMENTS

| | | | |
|---|---|---|---|
| JP | 2008196006 | A | 8/2008 |
| JP | 2010-518252 | | 5/2010 |
| JP | 2010234477 | A | 10/2010 |
| JP | 2011029465 | A | 2/2011 |
| JP | 2013-021919 | | 1/2013 |
| KR | 10-2005-0067222 | | 6/2005 |
| KR | 10-2005-0103217 | | 10/2005 |
| KR | 10-2012-0130163 | | 11/2012 |
| WO | WO 2012/147922 | | 11/2012 |
| WO | WO 2014/020406 | | 2/2014 |

OTHER PUBLICATIONS

Written Opinion of the International Searching Authority for PCT/KR2015/003279 dated May 13, 2015 (4 pages).
Japanese Patent Application SN 2016-563043, First Office Action and English Translation, dated Jul. 12, 2017, 14 pages.
Second Office Action in Japanese Patent Application No. 2016-563043, dated Mar. 22, 2018, English translation only (4 pages).
Second Office Action in Chinese Patent Application No. 201580023179.5, dated Jul. 4, 2018, with English translation (4 pages).
Partial Supplementary European Search Report in European Patent Application No. EP 15779336.5, dated Jun. 27, 2018 (21 pages).

* cited by examiner (a) (b)

CURRENT TRANSFORMER DEVICE

TECHNICAL FIELD

The present invention relates to a method of manufacturing a separable electromagnetic inductive apparatus for power, and more particularly, to a method of manufacturing a low cost separable electromagnetic inductive apparatus for power by winding and cutting a magnetic core made of a non-cobalt material in a way that an air gap is minimized during the manufacturing process of the separable magnetic core.

BACKGROUND ART

A coupling device has been developed in a direction of attenuating low frequency signals and improving high frequency signal characteristics since the coupling device generally used in a power system is used for the purpose of blocking power frequencies and delivering only a communication signal in a high frequency band. Further, in the case of a current transformer (CT) application, the CT has been developed in a direction particularly for improving the linearity to obtain an ideal B-H characteristic.

However, the characteristics of such coupling devices become meaningless when these coupling devices are used for power generation, and further the characteristic of attenuating the power frequency may be fatal to power generation. Accordingly, the power CT should be configured to have reverse characteristics to the existing CTs as follows;

(1) Power frequency characteristics should be maximized and other high frequency signals should be minimized. That is, the characteristic should be maximized in the frequency range below 120 Hz which is a doubled frequency of the power frequency of 60 Hz, and the characteristics should be minimized in the frequency range above 120 Hz to be as low as possible;

(2) The linear B-H characteristics required by a general CT is not necessarily required; and (3) A general high saturation characteristic is not required, and rather a comparatively lower saturation characteristic by the required power energy is more effective. (an immoderate induction voltage in high power line current should be prevented) (see FIG. 1); and (4) The existing CT manufacturing process should be used as it is, and should be realized even from low cost materials.

However, such conditions are quite appropriate characteristics for manufacturing the power CT but are reverse characteristics required by inductors, common CTs and the like, and therefore the manufacturing technology for common inductors or CTs may invite a big difficulty when it is used as it is for manufacturing the power CT having the desired characteristics.

That is, the high saturation induction characteristic is required in inductors or CT applications to enhance the linearity and to raise a signal to noise ratio in high frequency band, but on the contrary, since the high saturation induction characteristic rather generates an immoderately high induction voltage in high power line current, the separable CT causes many problems in treating the high induction voltage as is used as power source.

Meanwhile, since the power CT operates on an AC line, the shape of a magnetic flux density occurring in a general magnetic line also appears to be a sine wave form, and although occurring, a magnetic saturation is only a temporary phenomenon and does not involve a big problem in securing power source, but rather a high magnetic saturation generates a too high induced electromotive force, which may lead to difficulties in managing the generated power.

FIG. 1 is a graph of B-H curves showing preferred characteristics of a power CT. As shown in FIG. 1, unlike inductors or typical cores, the power CT exhibits higher characteristics than typical cores when a low current flows through a power line, and the power CT should have a characteristic not higher than that of inductors or typical cores when a high current flows through the power line in order to prevent an excessive induced voltage from occurring.

However, a number of various limitations are caused when the power CT is made of a magnetic alloy used for existing common inductors or CTs as described above.

DISCLOSURE

Technical Problem

To solve the limitations of the related art, the present invention provides a method for manufacturing a separable electromotive inductive apparatus for power that may generate necessary electric power from a low power line current and have a low magnetic saturation point.

Technical Solution

The present invention comprises; winding a steel plate composed of a rolled amorphous magnetic alloy to a circular shape to form a magnetic core; heat treating and impregnating the wound magnetic core without adding cobalt; cutting the heat treated and impregnated magnetic core in an orthogonal direction against the wound direction of the magnetic core; and polishing the cut surface of the magnetic core having the three-dimensional surface of the cut surface evenly arranged in a fixed state.

In an embodiment, the amorphous magnetic alloy may comprises a silicon steel (Si steel).

In an embodiment, the impregnating may comprise a vacuum impregnating.

In an embodiment, the cutting may comprise the cutting the magnetic core to a semi-circular shape in a fixed state to the cutting direction and to an orthogonal direction to the cutting direction of the magnetic core.

The polishing in an embodiment may comprise the polishing with a coolant being applied simultaneous with the polishing process.

Advantageous Effects

A method for manufacturing a separable electromagnetic inductive apparatus for power in accordance with the present invention may produce power by a non-contact electromagnetic inductive method from current flowing through a power line system and may manufacture a high efficiency separable inductive apparatus which exhibits a high saturation induction characteristic when a low current flows through the power line and exhibit a not-high saturation induction characteristic when a high current flows through the power line so that the power output may be easily adjusted.

Also, the present invention makes it possible to manufacture a separable inductive apparatus that may prevents an excessive induced voltage from occurring by the not-high saturation characteristic and may therefore provide a stable power source to the load side.

Further, according to the present invention, a separable electromagnetic inductive apparatus having the not high saturation induction characteristic and suitable for the power energy source may be manufactured at cheaper costs by being manufactured from an inexpensive material by the existing magnetic core manufacturing process without using cobalt during a heat treating process.

MODE FOR INVENTION

Hereinafter, preferred embodiments of the present invention will be described with reference to the accompanying drawings to fully explain the present invention in such a manner that it may easily be carried out by a person with ordinary skill in the art to which the present invention pertains. The present invention may, however, be embodied in different forms and should not be construed as limited to the embodiments set forth herein.

The present invention relates to a method for manufacturing an electromagnetic inductive apparatus for power, which functions as a power CT generating electric power using a magnetic field signal occurring from a power line. According to the present invention, the electromagnetic induction apparatus for power is manufactured in a separable type which can be easily installed to and removed from power lines in use, and is cut such that three-dimensional planes of cut surfaces are evenly leveled in order to minimize the amount of magnetic flux leaking from the surface on which the two cores are coupled to each other. Further, according to the present invention, a non-cobalt silicon steel is used to enhance the signal delivery characteristic in a low frequency band, particularly in a power frequency range of 120 Hz and below, obtain a high induced power in a low power line current, and the magnetic core is manufactured in a way of reducing an air gap effect from the use of the steel plate in order to achieve the low cost manufacturing as well as to maintain a high permeability.

Particularly, the electromagnetic inductive apparatus manufactured by the method of the present invention may provide a high output in a low power line current while preventing an excessive voltage from being induced in a high power line current by keeping the magnetic saturation point at a relatively lower value than those of general sensors or CTs.

Figure 2:
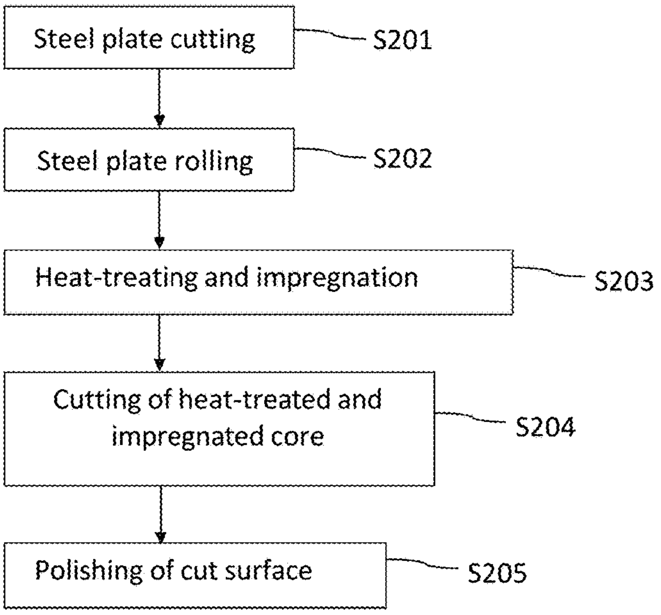
FIG. 2 is a flow chart of a method for manufacturing a separable electromagnetic inductive apparatus in accordance with an embodiment of the present invention.

First of all, a method of manufacturing a separable electromagnetic inductive apparatus in accordance with an embodiment of the present invention is described with reference to FIG. 2. FIG. 2 is a flow chart of a method of manufacturing an electromagnetic inductive apparatus in accordance with an embodiment of the present invention.

A method (200) for manufacturing an electromagnetic inductive apparatus includes a cutting step (S201) cutting a steel plate constituting a magnetic core, a winding step (S202) rolling the cut steel plate in a circular form, a treatment step (S203) heat-treating and impregnating the wound magnetic cores, a cutting step (S204) cutting the heat-treated and impregnated magnetic cores, and a cut surface processing step (S205) polishing the cut surfaces of the magnetic cores.

In more detail, first of all, a steel plate made of a rolled amorphous magnetic alloy is cut (S201) as shown in FIG. 2 for manufacturing magnetic cores. The material used for the electromagnetic inductive apparatus for power in accordance with the present invention has a maximum magnetic flux density, a high resonance frequency, a low resistivity, a low core loss, and a permeability which is not so high. This is because the magnetic saturation point is not required to be as high as described above, and a loss factor and a material workability are taken into consideration. No material yet completely satisfies such conditions so far. The resistivity index is not taken into a big consideration since the operating frequency of the power CT is in a power frequency range of 50-60 Hz. The closest material to such conditions is silicon steel which is a metallic material having a low cobalt content. Accordingly, the use of a non-cobalt magnetic material or a magnetic material with a minimum cobalt content (such as silicon steel) allows a high inductive power to be obtained in a low power line current and the magnetic saturation point to be reduced simultaneously.

Meanwhile, an Eddy current loss is a main factor of the core loss, but may be greatly reduced when a thin steel plate made of silicon steel having not high permeability is used and wound by the a rolling technique.

Then, the cut steel plate is wound by the rolling technique so that a circular shaped magnetic core is formed (S202). In the winding step, multiple core layers 120 are stacked to form a single circular core.

Figure 3:
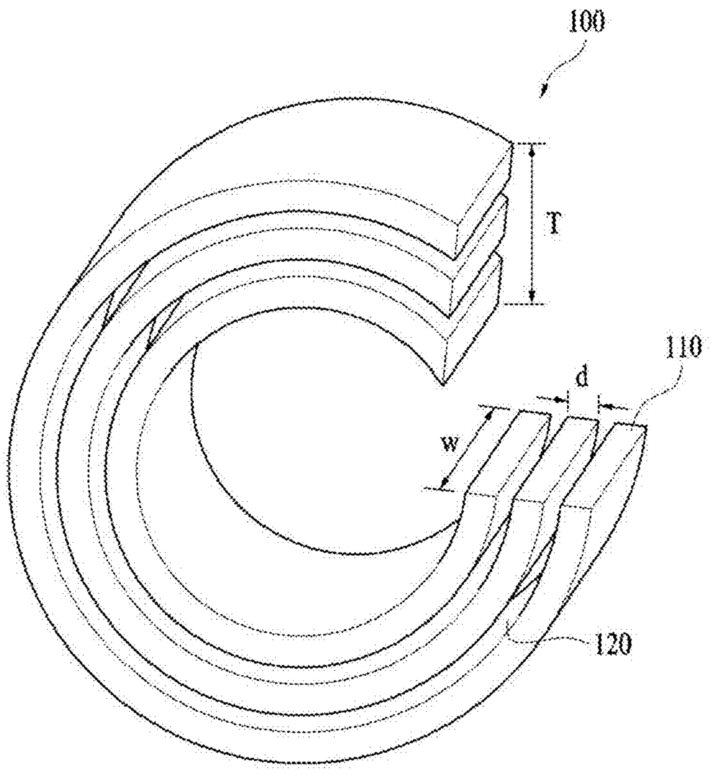
FIG. 3 is a perspective view of a magnetic core wound in accordance with the winding step in FIG. 2.

FIG. 3 is a perspective view of the magnetic core wound in accordance with the winding step in FIG. 2.

As shown in FIG. 3, a core layer 110 having a width of W and a thickness of d is wound to have a total thickness of T by the rolling technique. The present invention employs the rolling technique for winding the steel plate in order to minimize an air gap 120 which possibly occurs on a coupling surface between the core layers 110, and reduces the permeability of the magnetic core. That is, when the circular shaped magnetic core is manufactured by the rolling technique, the air gap 12 between the core layers 110 may be minimized, and the Eddy current loss is accordingly reduced, so that the deterioration of the performance, particularly the permeability deterioration by the air gap may be greatly reduced. In general, it is not easy to reduce the air gap in some expensive and high permeability materials in consideration of the manufacturing process, and thus the permeability lower than expected is obtained and the performance will be lower than desired despite the high manufacturing cost.

Then, the circular magnetic core is heat treated and impregnated (S203). In this step, the heat treatment and the impregnation process may be carried out in any order, for example, the heat treatment may be carried out after the impregnation process or reversely, or the heat treatment and the impregnation processes may be carried out simultaneously. The specific conditions of the heat treatment and impregnation employ the general treatment method of magnetic cores and therefore detailed description thereof is not made herein.

However, the heat treatment process of the present invention is performed without further adding cobalt during the process, and when the least amount of cobalt is contained for the resistance of the steel plate itself through the heat treatment process, a uniform density and a no-high saturation induction characteristic can be maintained.

Figure 1:
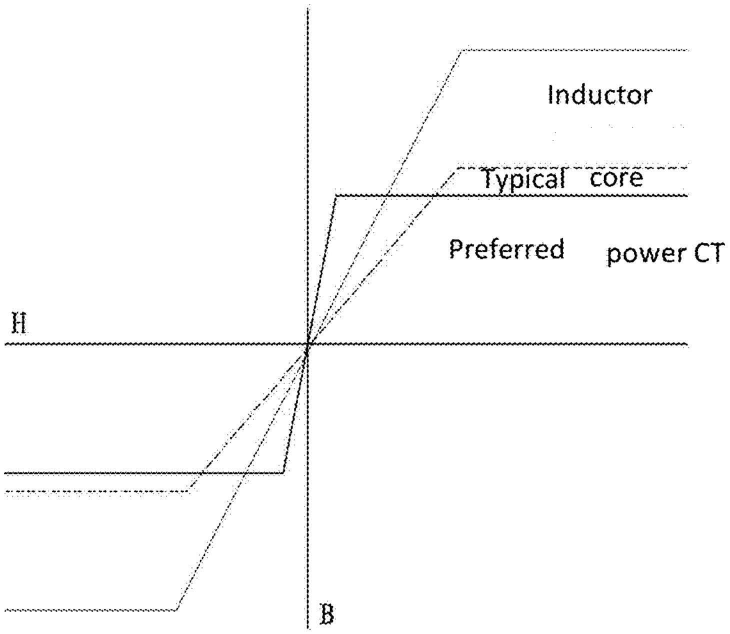
FIG. 1 is a graph of a B-H curve exhibiting characteristics of a preferred power CT.

Further, the impregnation process is preferably a vacuum impregnation process, and the vacuum impregnation process may minimize the air gap of the circular magnetic core. Accordingly, as shown in FIG. 1, the magnetic core in accordance with the present invention improves the characteristic in a low power distribution line current compared to general cores or inductors, and may have a relatively lower saturation characteristic.

Then, the heat treated and impregnated magnetic core is cut to form a separable magnetic core (S204). The magnetic core is cut in a direction orthogonal to the wound direction of the magnetic core in this process. That is, the magnetic core is cut to have a semi-circular shape in a state that the magnetic core is fixed in the cutting direction and in the direction orthogonal to the cutting direction of the magnetic core 100.

Figure 4:
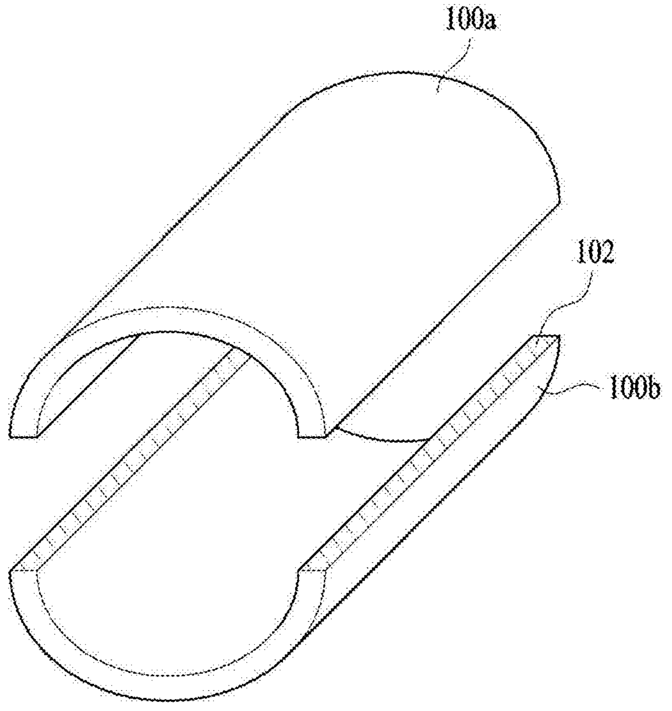
FIG. 4 is a perspective view of the magnetic core cut in accordance with the cutting step in FIG. 2.
Figure 5:
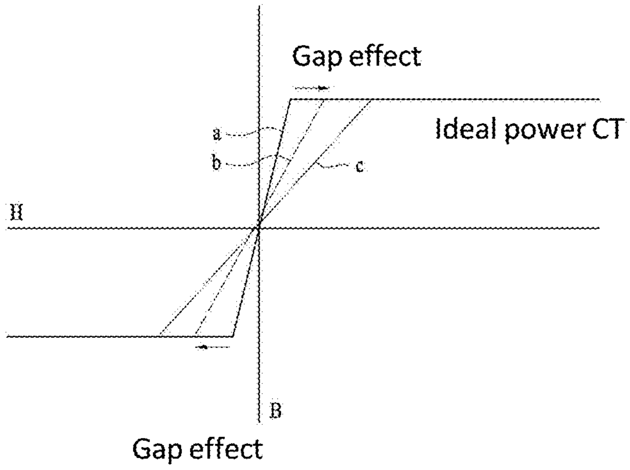
FIG. 5 is a graph illustrating variations of the B-H characteristic in accordance with the cutting of the magnetic core.

The cutting process is a process for manufacturing a separable magnetic core which may be installed to or removed from the power line regardless of the status of the power line, and a detailed description is made with reference to FIGS. 4 and 5. FIG. 4 is a perspective view of the magnetic core cut in the cutting process, and FIG. 5 is a graph showing variations of the B-H characteristic varying by the cutting of the magnetic core.

As described above, the not-high saturation inductive characteristic may be provided in a cheaper way by minimizing the cobalt content in the cold rolled magnetic alloy such as Si—Fe without adding a cobalt (co) component during the heat treatment process. However, when the magnetic core is cut for manufacturing a separable core, the reluctance occurs by the gap between the cut surfaces, resulting in the leakage of the magnetic flux.

As shown in FIG. 4, a gap may be formed by a cut portion between the cut surfaces 102 of the two magnetic cores 100*a* and 100*b* when the two magnetic cores are coupled together.

Such a gap between the cut surfaces 102 corresponds to an effect that a loop of a magnetic field occurring in the power line increases depending on the size to exhibit the same effect as a change of the B-H characteristic as shown in FIG. 5, and particularly the characteristic in a low power line current is lowered, i.e. the power generation in the low power line current may be reduced.

In an embodiment of the present invention, the magnetic core 100 is cut to have a semi-circular shape in a state that the magnetic core is fixed in the cutting direction and the direction orthogonal to the cutting direction of the magnetic core. That is, the gap between the cut surfaces 102 of the magnetic core is minimized, so that the magnetic reluctance caused by the gap may be reduced. Accordingly, good performance of the magnetic core can be maintained without adding another magnetic material or an oxide in the gap to minimize the magnetic flux leaking at the cut surface 102. (see FIG. 5A).

This reduces the resonance frequency of the magnetic core by allowing the magnetic core to have a low L, but, does not involve a serious problem since the operating frequency of the power CT is the power source frequency, and rather a more effective characteristic is exhibited in the low power line current by allowing the inherent permeability of the magnetic substance to be maintained.

Figure 6:
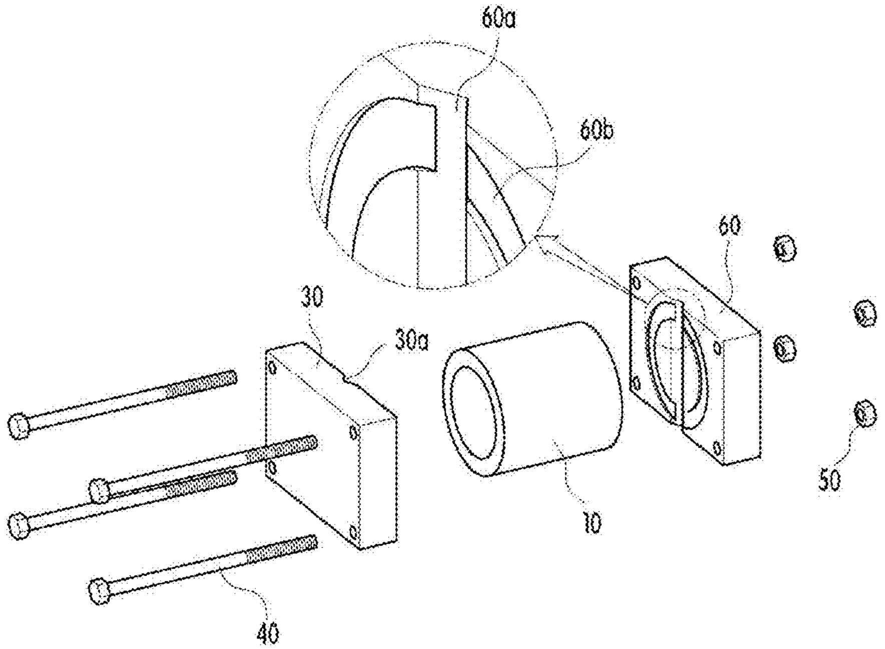
FIG. 6 is an exploded view illustrating a cutting jig to perform the cutting of the core shown in FIG. 2.

A specific example of the cutting process is described in detail with reference to FIG. 6. FIG. 6 is a perspective exploded view illustrating the cutting jig to perform the cutting process shown in FIG. 2.

As shown in FIG. 6, a jig for cutting the magnetic core 100 is fixed to the top surface of a base 20 by assembling and fixing a circular core 10 between a guiding plate 30 and a fixing plate 60 using bolts and nuts 40 and 50. When the circular core 10 is in a fixed state as described, a cutting means such as a wire of an electric spark machine inserted in a groove 30*a* or 60*a* disposed for cutting purpose on the guiding plate 30 or the fixing plate 60 cuts the magnetic core moving toward a direction orthogonal to the wound direction of the magnetic core. The cutting groove 30*a* and 60*a* is formed in the guiding plate 30 and the fixing plate 60 as described above, and besides other grooves 60*b* for mounting one and another surface of the magnetic core are formed, respectively. Accordingly, the core 10 is inserted in the mounting groove 60*b* designed to fit to the size of the core, and assembled by fixing means such as bolt 40 and nut 50 so that the core 10 is completely fixed on the top surface of the base 20.

Since the cutting jig is fixed to both X-axis (the cutting direction) and Y-axis (direction orthogonal to the cutting direction), the target core 10 is cut into a complete semi-circular shape around the predetermined center such that the imbalance of power forced during the cutting process is minimized and the core 10 may be protected from deformation.

The present invention is not limited to the method of cutting the core using the cutting jig shown in FIG. 6, and it is preferred to cut the magnetic core of which the magnetic core is fixed in both of the cutting direction and to the direction orthogonal to the cutting direction.

Again referring to FIG. 2, a coolant is provided while the cut surface 102 of the magnetic core 100 is polished. The polishing process is a process for minimizing the gap of the cut surface 102 of the magnetic core 100 as well as equalizing the coupling surface of the magnetic core 100, and the cut surface 102 is polished by grinding the cut surfaces with a grinding stone after the three-dimensional planes of the cut surfaces 102 of the magnetic core are fixed to be evenly leveled.

Figure 7:
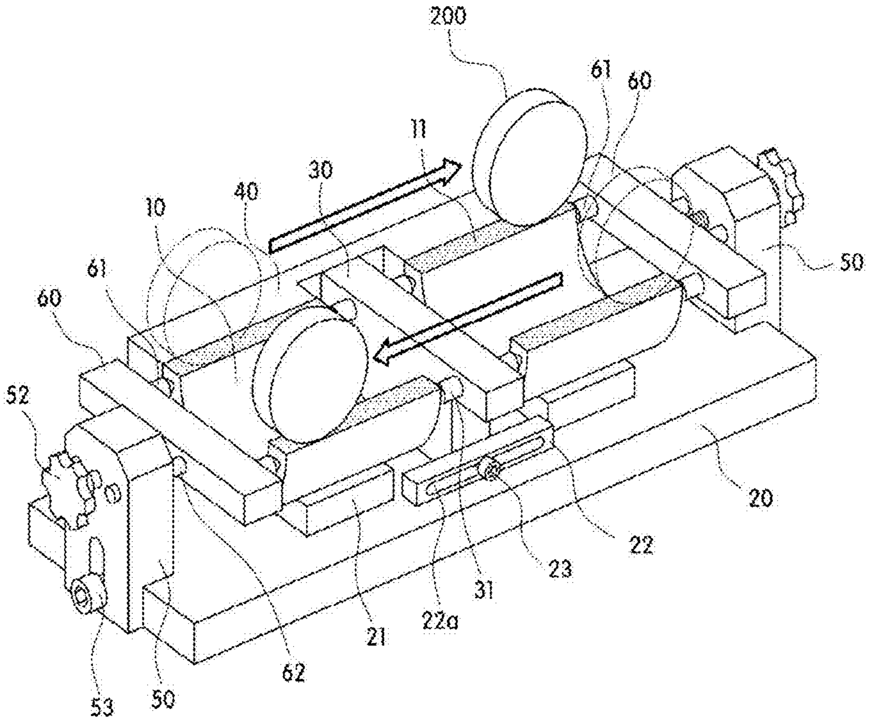
FIG. 7 is a perspective view illustrating an operation status of a polishing jig for performing the polishing step shown in FIG. 2.

A specific example of such a polishing process is more particularly described with reference to FIG. 7. FIG. 7 is a perspective view illustrating an operation status of the polishing jig for performing the polishing step of FIG. 2.

As shown in FIG. 7, the polishing jig for polishing the cut surfaces 102 of the magnetic core 100 includes a base plate 20 defining a horizontal surface, a pair of top and bottom fixing plates 60 which are installed to contact the top and bottom surfaces of the magnetic core 10 in a direction orthogonal to the axis direction of the magnetic core 10 and is installed to move along the axis direction of the magnetic core while cut surfaces of the magnetic core 10 are placed toward an upward direction and wherein the fixing plate, a side plate 40 in a close contact with a side surface of the magnetic core 10 and assembled with the base plate 20 to maintain horizontality of the cut surface (11) of the magnetic core 10, and a center plate 30 disposed between the magnetic cores to be in close contact with the top surface of one magnetic core and the bottom surface of another magnetic core 10 and installed on the upper surface of the base plate 20.

Sequence of the process begins with placing the center plate 30 in a position suitable to the size of the magnetic core 10 and screwing an adjustment bolt 23 running through a slot 22*a* of an adjustment slider 23 to the center plate 30 to fix the same. When the magnetic core 10 is placed on a supporting substrate 21, the side plate 40 is adjusted in height to meet the size of the magnetic core 10 and fixed by screwing the bolt 25 while the top and bottom surface of the magnetic core 10 are in contact with a pointer 31 of the center plate 30, and the magnetic core 10 is adjusted on the supporting substrate 21 to ensure the cut surface 11 of the magnetic core being positioned parallel to the side plate 40. Then, the pointer 61 of the fixing plate 60 is moved to be in close contact with the top and bottom surfaces of the magnetic core 10 by turning a handle 52 of a support bar 50. The magnetic core 10 is fixed in such way. When the magnetic core 10 is fixed, the polishing process begins.

For polishing process, the base plate 20 is fixed to a polishing device in an electronic way or by a clamp while the magnetic cores 10 are in a fixed state to the jig. In such a state, a grinding stone 200 is moved down to begin the polishing process as shown in FIG. 7.

The present invention is not limited to a method of using the polishing jig for polishing as shown in FIG. 7 but may include any preferred method of polishing the cut surface of the magnetic core in a fixed state such that the three-dimensional planes of the cut surfaces are evenly leveled.

Figure 8:
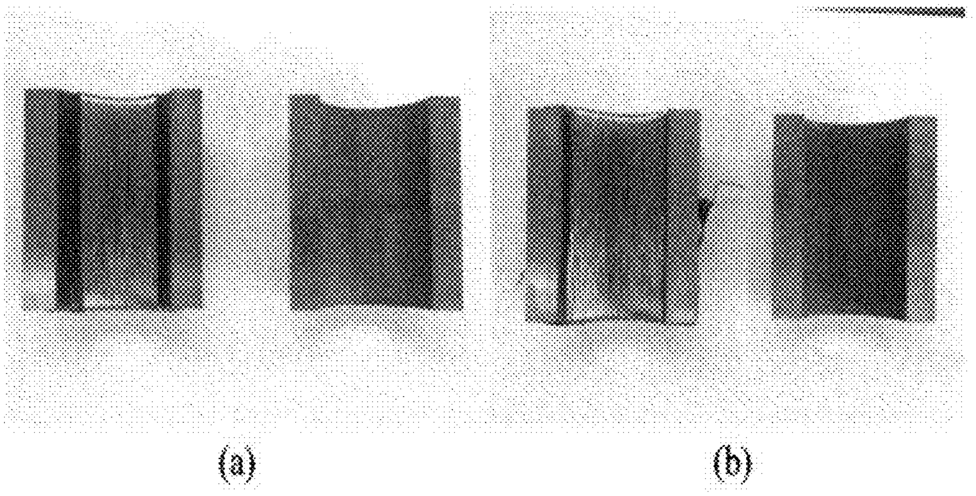
FIG. 8 shows photographs of separable magnetic cores of comparative samples and embodiment samples (b).

FIG. 8 is photographs of separable magnetic cores in accordance with comparative samples (a) and embodiment samples (b).

The magnetic cores of the comparative example (a) and the embodiment sample (a) are manufactured by the same process with different silicon steel plates having a different cobalt component. The magnetic cores manufactured in such a way are shown in FIGS. 8*a* and 8*b*, and the embodiment samples (b) contain an amount of cobalt which is less than that of the comparative samples (a) by about 50%.

Figure 9:
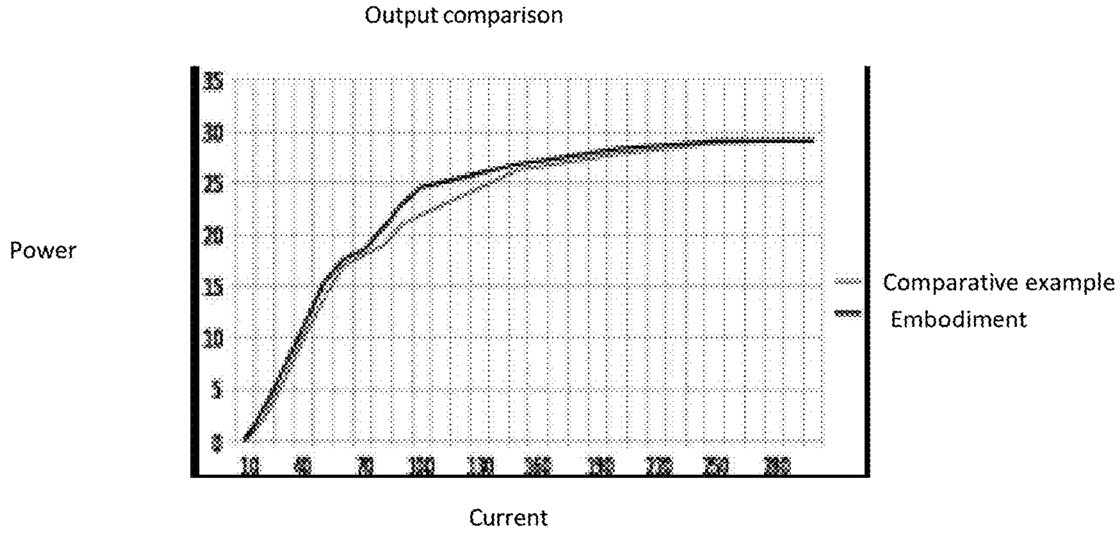
FIG. 9 is an output comparison graph of each of the magnetic cores shown in FIG. 8.

An output characteristic between the comparative example and the embodiment is shown in FIG. 9. FIG. 9 is a comparison graph showing the output characteristic of the magnetic cores shown in FIG. 8.

As shown in FIG. 9, the magnetic core (b) manufactured with a magnetic material having a low saturation characteristic exhibits a high power characteristic in low power line current, and exhibits a relatively low output value in high power line current because the magnetic saturation point is low. This characteristic may perform a primary role to prevent the power CT from driving an immoderate power which is higher than what is required to an electronic system.

TABLE 1

| Power line current [mA] | Comparative Example (W) | Embodiment (W) |
|---|---|---|
| 10 | 0.01 | 0.23 |
| 15 | 0.86 | 1.55 |
| 20 | 2.3 | 3.35 |
| 30 | 5.85 | 7.07 |
| 40 | 10 | 11.2 |
| 50 | 13.69 | 15.3 |
| 60 | 17.1 | 17.7 |
| 70 | 18 | 18.5 |
| 80 | 19 | 20.7 |
| +90 | 21 | 23 |
| 100 | 22 | 24.38 |
| 150 | 26.3 | 26.84 |
| 200 | 27.8 | 28.3 |
| 250 | 28.87 | 29.1 |
| 300 | 29.23 | 29.14 |

As described in FIG. 9 and Table 1, the magnetic core manufactured by the embodiment of the present invention has a higher power characteristic in low power line current compared with the existing case and exhibits a relatively low output value because it reaches the magnetic saturation state faster.

By such a method, a high efficiency separable inductive apparatus with an easy adjustable output power having a high characteristic in low power line current and a saturation induction characteristic in high power line current may be manufactured. Also, by such a method, the separable electromagnetic inductive apparatus having a not-high saturation characteristic which prevents an immoderate induced voltage from occurring, providing a stable power to the load side accordingly, being manufactured in the existing magnetic core manufacturing process, and having not-high saturation characteristic suitable for a power source can be manufactured at cheap cost without using cobalt in a heat treatment process.

Although a preferred embodiment of the present invention has been disclosed, various changes and modifications may be made thereto by one skilled in the art without departing from the scope and spirit of the invention as set forth in the appended claims.

What is claimed is:

1. A current transformer device for harvesting power from a low-power electrical line, the device comprising:

- a current transformer configured to produce a secondary electrical current via magnetic induction responsive to a primary electrical current flowing through the low-power electrical line, said primary electrical current being less than 300 mA;
- said current transformer having at least a two piece separatable magnetic core couplable for surrounding a portion of the line;
- said magnetic core comprising of a magnetic material that has been heat treated in the presence of a cobalt-free material characterized by a low magnetic saturation characteristic to increase uniformity of density of the magnetic core and decrease the magnetic saturation characteristic of said magnetic core to similar or less than silicon steel, said treated magnetic material is configured to exhibit a higher saturation induction characteristic than a cobalt-containing material when producing the secondary electrical current via magnetic induction from the primary electrical current;
- said current transformer configured to output said secondary electrical current.

2. The device as defined in claim 1, wherein the magnetic material is an amorphous metal.

3. The device as defined in claim 1, wherein the magnetic material is an alloy.

4. The device as defined in claim 1, wherein the magnetic material comprises a non-cobalt material.

5. The device as defined in claim 1, wherein the magnetic material comprises silicon steel.

* * * * *